(12) United States Patent
Robbins

(10) Patent No.: US 7,273,065 B1
(45) Date of Patent: Sep. 25, 2007

(54) INFLATION/DEFLATION VALVE FOR CARGO DUNNAGE

(76) Inventor: James A. Robbins, 1527 Roane St., Covington, TN (US) 38019

( * ) Notice: Subject to any disclaimer, the term of this patent is extended or adjusted under 35 U.S.C. 154(b) by 131 days.

(21) Appl. No.: 11/202,512

(22) Filed: Aug. 12, 2005

(51) Int. Cl.
*F16K 15/20* (2006.01)
(52) U.S. Cl. .................. 137/223; 137/228; 137/233; 137/522; 137/523; 410/119; 441/41; 251/82
(58) Field of Classification Search ..... 137/223–234.5, 137/522, 523, 319; 410/119; 441/41; 251/82
See application file for complete search history.

(56) References Cited

U.S. PATENT DOCUMENTS

| | | | |
|---|---|---|---|
| 2,839,073 A | 6/1958 | Marsh | |
| 2,887,120 A * | 5/1959 | De See | 137/223 |
| 3,233,651 A | 2/1966 | Smith | |
| 3,785,395 A * | 1/1974 | Andreasson | 137/223 |
| 4,004,614 A * | 1/1977 | Mackal et al. | 137/232 |
| 4,015,622 A * | 4/1977 | Pagani | 137/223 |
| 4,368,756 A * | 1/1983 | Carlson | 137/541 |
| 4,478,587 A * | 10/1984 | Mackal | 137/224 |
| 4,579,141 A * | 4/1986 | Arff | 137/223 |
| 4,766,628 A * | 8/1988 | Walker | 137/232 |
| 4,823,831 A | 4/1989 | Jaw | |
| 4,924,899 A * | 5/1990 | Po | 137/232 |
| 4,927,397 A * | 5/1990 | Yeager | 137/234 |
| 5,111,838 A * | 5/1992 | Langston | 137/223 |
| 5,119,842 A | 6/1992 | Jaw | |
| 5,203,831 A * | 4/1993 | Lind et al. | 137/1 |
| 5,275,197 A * | 1/1994 | Finell | 137/234 |
| 5,343,889 A | 9/1994 | Jaw | |
| 5,367,726 A | 11/1994 | Chaffee | |
| 5,651,403 A | 7/1997 | Andersen | |
| 6,089,251 A * | 7/2000 | Pestel | 137/232 |
| 6,138,711 A | 10/2000 | Lung-Po | |
| 6,164,314 A | 12/2000 | Saputo et al. | |
| 6,237,621 B1 | 5/2001 | Chaffee | |
| 6,508,264 B2 | 1/2003 | Chaffee | |
| 6,755,208 B2 | 6/2004 | Chaffee | |
| 6,823,905 B1 | 11/2004 | Smith et al. | |
| 6,923,202 B2 * | 8/2005 | Enerson | 137/271 |
| 2003/0213518 A1 | 11/2003 | Zielinski et al. | |

FOREIGN PATENT DOCUMENTS

EP 0987194 3/2000

* cited by examiner

*Primary Examiner*—Eric Keasel
*Assistant Examiner*—Craig Price
(74) *Attorney, Agent, or Firm*—Wyatt, Tarrant & Combs, LLP

(57) ABSTRACT

A valve assembly for a dunnage bag wherein in the valve body a valve diaphragm is mounted on a shaft and is supported by a mounting bar such that the valve diaphragm may be reciprocally moved from the closed position to the open position by a simple axial push on the valve shaft. The valve shaft is retained in the mounting bar in an orifice and the shaft diameter is enlarged at its end distant from the valve diaphragm so as to generate a frictional force fit or lock in the open position to facilitate the removal of air from the bag. The valve may be released form the friction lock by the air pressure of a recharged bag and/or by the manual movement of the valve diaphragm and shaft axially toward the open end of the valve assembly.

9 Claims, 7 Drawing Sheets

INFLATION/DEFLATION VALVE FOR CARGO DUNNAGE

CROSS-REFERENCE TO RELATED APPLICATIONS

None

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to inflatable dunnage air bags as are utilized in securing cargo and/or freight in a cargo hold, such as a truck, rail car, aircraft or ship and more particularly, to an inflation valve therefor.

2. General Background of the Invention

Inflatable air bags are utilized in the cargo transportation industry to secure a load against undue movement during the transportation phase. While cargo is generally loaded as snugly into a vehicle as possible, such as a cargo hold of a truck or rail car, it is frequently of sufficiently irregular shape or varied size, it is not otherwise possible to ensure a tight fit during the loading process The transportation industry has adopted relatively large inflatable bags, often a plastic or rubber so as to be flexible and to readily conform to the irregular shapes of cargo loads. These bags are inserted into observable spaces in a load, and inflated with air to a pressure sufficient to keep the freight from shifting during the movement of transit, whether it be from swaying or being bounced vertically.

The dunnage bags are comprised of an inflatable bladder which is enclosed within an outer covering (also a bag) which protects the bladder from wear or puncture. The outer bags are frequently of fabric or paper. Bags may be of a variety of shapes and sizes, such that an appropriate shape or size may be fitted into the several voids that inevitably occur in a loaded container. Once fitted into the void, a bag/bladder is inflated with compressed air to a predetermined pressure level sufficient to prevent or retard the shifting or movement that otherwise occurs in travel.

One critical part of the dunnage bag is the valve which enables the rapid, facile inflation and deflation required in the loading and emptying of the container. Conventional construction includes the valve (a thermoplastic material) "welded" to the bladder so as to ensure a secure seal to retain the desired air pressure. The valve includes a generally tubular body portion which defines a conduit for the entry and exhaust of the pressurized air into and out of the bag. Within this tubular body is mounted a valve member which seats on a cooperating seal, usually a ring, the combination of which provides a tight joinder, particularly for the pressurized situation, to retain the pressurized air in the bag providing the desired load security against movement, and shifting. Many conventional valves are spring loaded to the closed position to facilitate the seal of the charged air, allowing also the manual depression against the spring to open the valve for natural deflation. Another common construction incorporates a hinged valve member that securely seats to form a seal. A number of patents are illustrative of the state of the art.

U.S. Pat. No. 4,579,141 Arf illustrates a valve for filling and discharging inflatable hollow bodies, in this instance a dinghy. The valve is self closing, as is conventional of valves for dunnage bags. The valve plate is spring loaded, to the closed position by radial leaves which cause the valve plate to bear on a sealing ring, when the valve is in the inactivated state.

U.S. Pat. No. 5,651,403 to Andersen shows a valve for sack, such as a dunnage bag, to be filled with pressurized air through a nozzle to the valve. The valve is hinged and opens the filling nozzle in relation to the sealing flange.

U.S. Pat. No. 6,823,905 to Smith, et al shows an alternative inflation valve for a dunnage bag having a flapper valve member which is affixed on a chordal segment of the circular valve opening. Opposite end portions of the fixation bar project radially inwardly toward each other so as to define detents for maintaining the valve in the open position.

SUMMARY OF THE INVENTION

The present invention is directed to a novel valve for a dunnage bag which provides improved functionality by having a piston-like operational structure for the valve diaphragm and shaft enabling secure filling and sealing of the bag against air leakage, yet simple release of the valve diaphragm for facile, rapid emptying of the bag facilitating the removal of the bag when unloading cargo.

Among the further objects of the present invention are the providing of a dunnage bag valve assembly which overcomes the operational drawbacks of many prior art inflation valves.

A further object of the present invention is to provide an improved valve assembly which includes a minimized number of operational parts so as to lessen the likelihood of malfunction.

A still further object of the present invention is to provide an improved valve assembly for a dunnage bag which may be manually moved to an open condition, in which condition the valve diaphragm is retained open for rapid, complete emptying of the bag of air.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
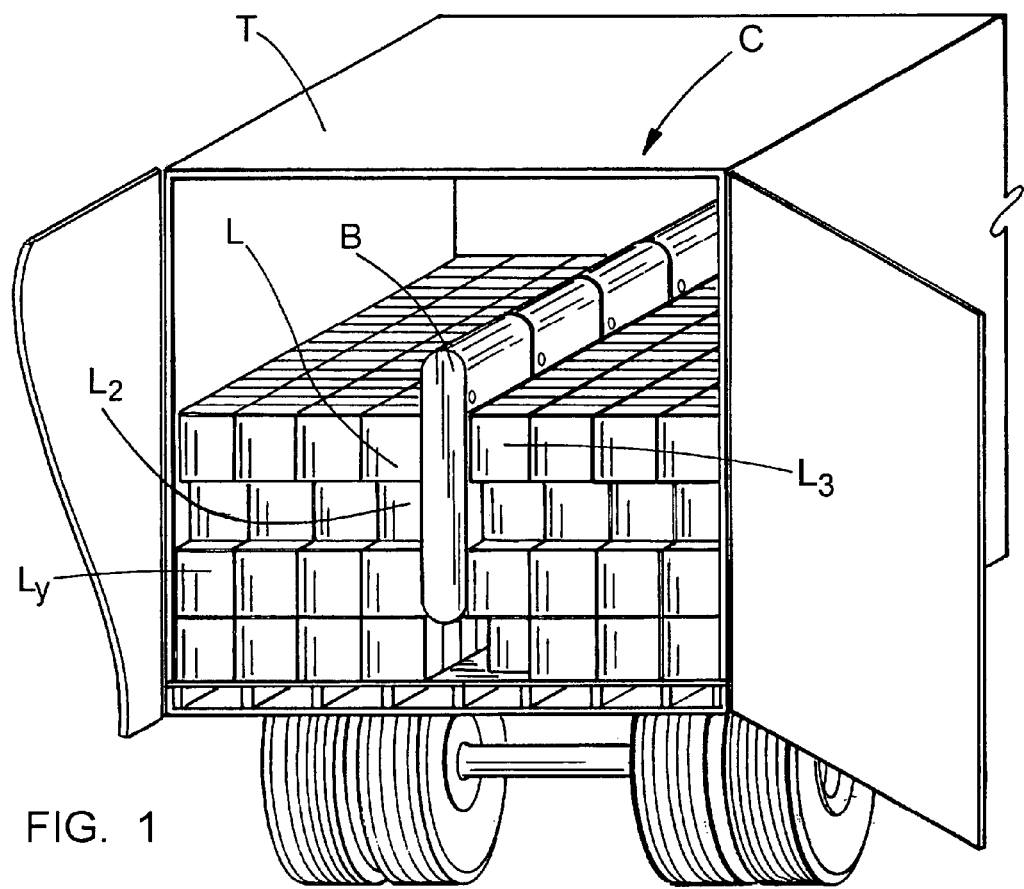
FIG. 1 is a pictorial view showing use of a dunnage bag incorporating the present invention.
Figure 2:
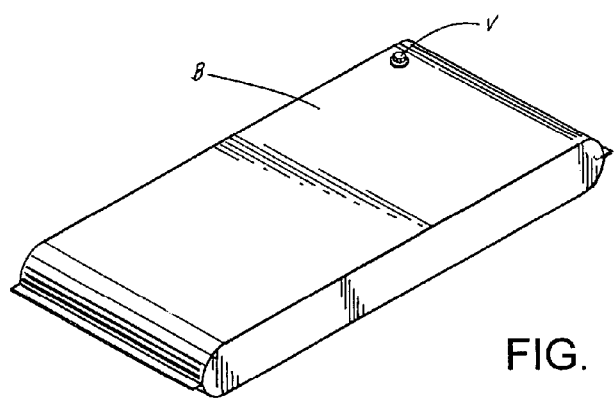
FIG. 2 is a pictorial view of a dunnage bag incorporating the present invention.

FIGS. 1 and 2 show generally the application of the dunnage bag in which the present invention has use. FIG. 1 illustrates a bag B disposed in the cargo area C of a truck trailer T intermediate load articles $L_1$, $L_2$, $L_3$, ... $L_y$. FIG. 2 generally illustrates a dunnage bag having a valve V for inflation and deflation. Dunnage bags are used principally in long haul transportation of boxed or crated loads. As known in the art, it is important to secure the load against shifting and other movement which might allow the cargo to become damaged. Dunnage bags have become a very useful tool to be placed into openings between adjacent boxes or crates.

In use, the bags are located in the desired space in the cargo container and inflated to a preferred pressure. It is important that the valve assembly 10 attached to the dunnage bag be simple and reliable in use, otherwise the loading process will be delayed. Likewise, it is important that the valve assembly 10 retain a good seal throughout the transit, otherwise the security of the load be compromised. It is an objective of the present invention to provide a valve having as simple a construction as is effective to maintain a proper seal on pressurization, yet permitting a quick and effective discharge of the contained air when the transportation run is terminated and unloading of the cargo is effected. Two general styles of construction are evidenced by the prior art. The first is a hinged valve member, seating on a rib or flange forming a valve seat. The second version is a circular valve which seats on a cooperating circular flange, and is spring loaded in the closed position, thus requiring a continuing activation to exhaust any air loaded into it. Both of the prior art versions of valves are subject to malfunction, and tend to be significantly more expensive that the present invention. The virtue of the present design is its simplicity, being a circular valve that is mounted on a shaft which is easily moveable to the open or closed position. The pressure of the loaded air in pressurizing the dunnage bag retains the valve in the closed position when in use in transit. The frictional engagement of a portion of the mounting shaft on a ring mount retains the valve in the open condition for efficient, expedient emptying of the dunnage bag. The simplicity of the construction provides the low cost and the reliability of the design. As known by those skilled in the art, bags and valves are constructed of various types of polymer materials, frequently thermoplastics. Resilient components may also be fabricated of one of several suitable robbers.

Figure 3:
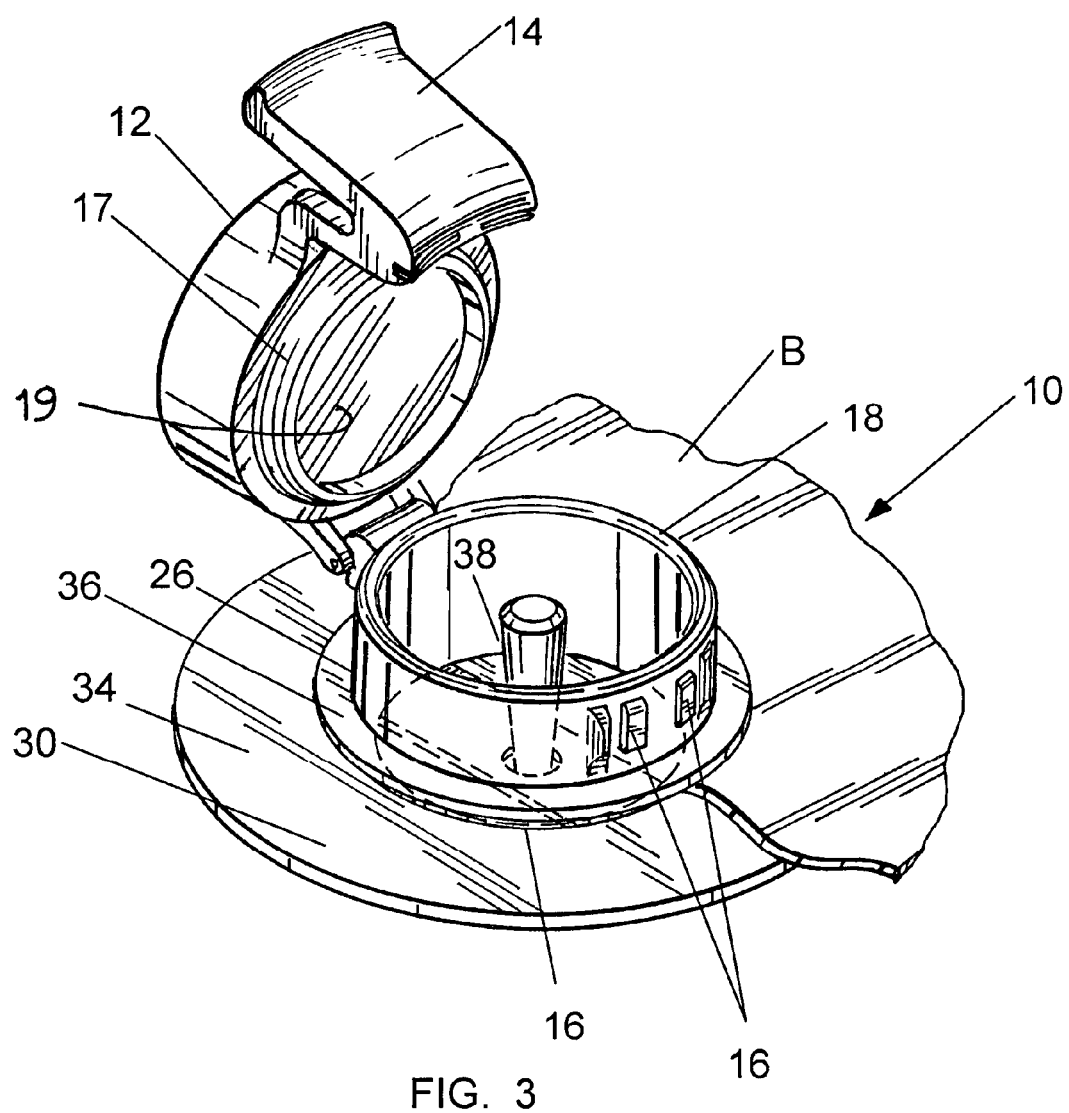
FIG. 3 is a perspective view of a preferred embodiment of the valve of the present invention
Figure 4:
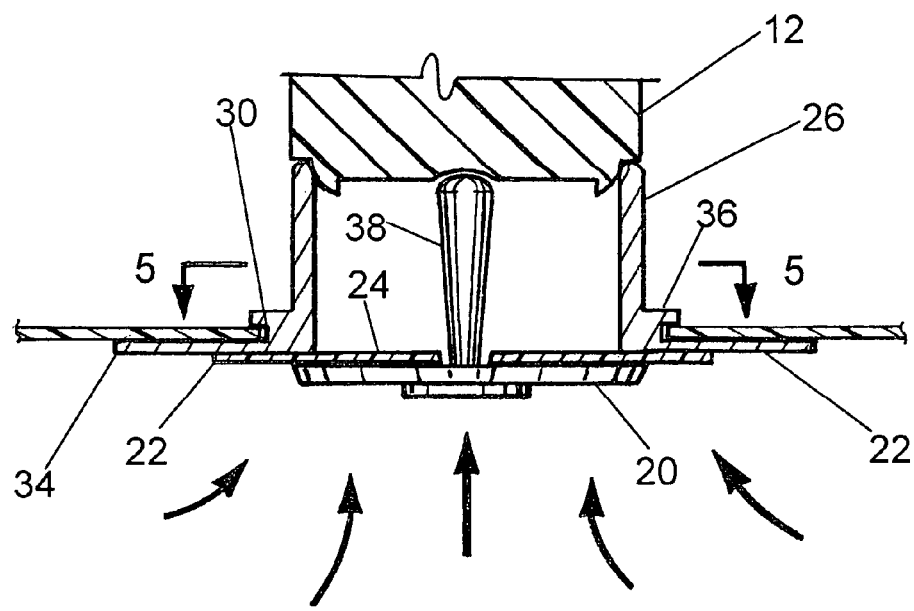
FIG. 4 is a side elevation view of the valve illustrated in FIG. 3.
Figure 5:
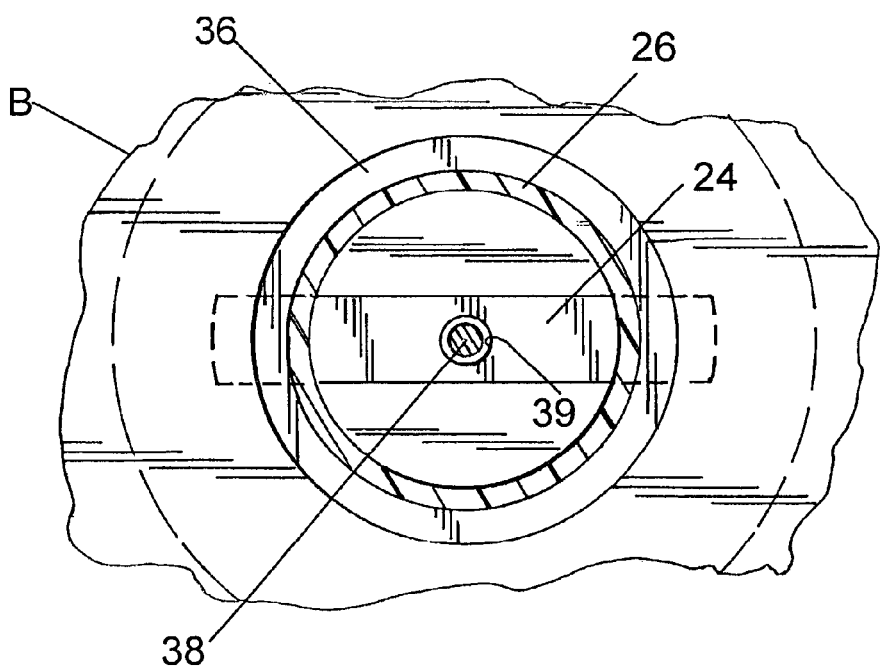
FIG. 5 is a top view of the valve illustrated in FIG. 3, with the cap removed.
Figure 6:
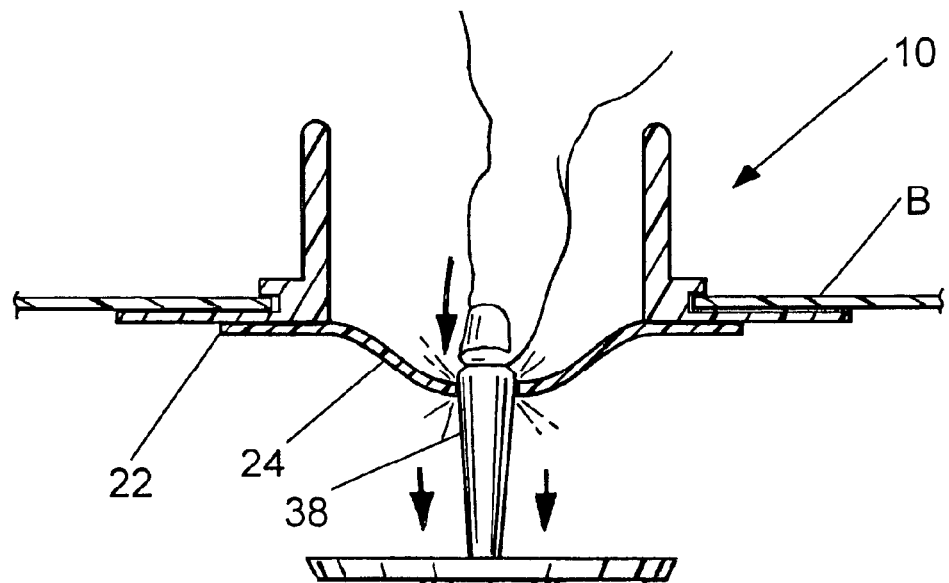
FIG. 6 is a side elevation view of the valve illustrated in FIG. 4, further illustrating opening of the valve for deflation of the dunnage bag.
Figure 7:
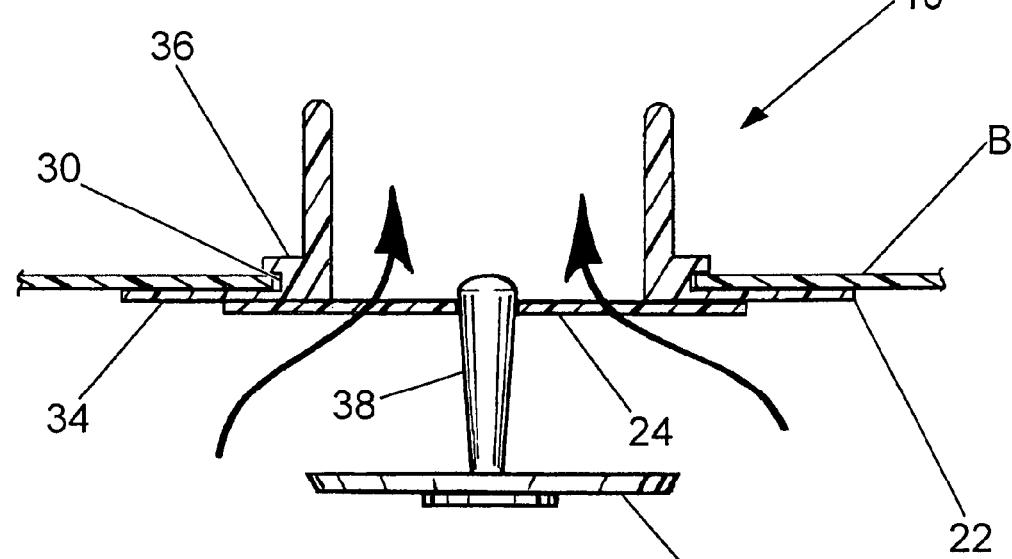
FIG. 7 is a side elevation view of the valve illustrated in FIG. 3, with the valve fully open.

Referring now to FIGS. 3 through 5, it may be seen that the valve assembly 10 of the present invention includes valve diaphragm 20 which is generally circular in shape and seats on flange 22, into which mounting bar 24 is disposed. Flange 22 is sealed against valve body 26 which is mounted in bag B and affixed by such as being ultrasonically welded, and preferably additionally disposed into annular detent 30 formed by adjacent radial ring flanges 34 and 36. The integration of the bag B to the body 26 as at flanges 34, 36 creates an air-tight seal around the valve assembly 10. Valve diaphragm 20 is mounted on shaft 38, as by suitable attachment means as ultrasonic welding, a fastener such as a screw or by an adhesive. The connection between shaft 38 and valve diaphragm 20 may be reinforced as by adding a washer 40 overreaching the contact area between shaft 38 and diaphragm 20. Washer 40 is preferably of a resilient material however, exhibiting a greater durometer than diaphragm 20. Shaft 38 and diaphragm 20 are supported in valve assembly 10 by mounting bar 24, by being slidably received through orifice 39. As may be best observed in FIGS. 6 and 7, shaft 38 has a generally increasing diameter progressing from the end of the attachment of diaphragm 20 and the free end 42. The diameter for an extent adjacent the free end 42 is sufficiently greater than the orifice 39 in which shaft 38 is mounted. By such means, shaft 38 is retained in orifice 39 however, is free for axial movement as indicated in FIG. 6 whereby the valve may open and allow air to be added to bag B, or for the bag B to be evacuated as illustrated in FIG. 7. Free end 42 may exhibit the continued taper of shaft 38 as illustrated in FIG. 7, or have an extended section of a diameter sufficient to retain valve diaphragm 20 in the open position, as illustrated in FIG. 8 and later discussed.

Valve assembly 10 conventionally includes a protective cap 12, as illustrated in FIG. 3. Cap 12 may include a latching handle 14 which engages lugs 16 on body 26 to retain the cap in a tightly fitting relationship when closed. Cap 12 may include such as flat washer 17 which is engaged by the upper surface of an annular seal 18 on valve body 26.

Figure 8:
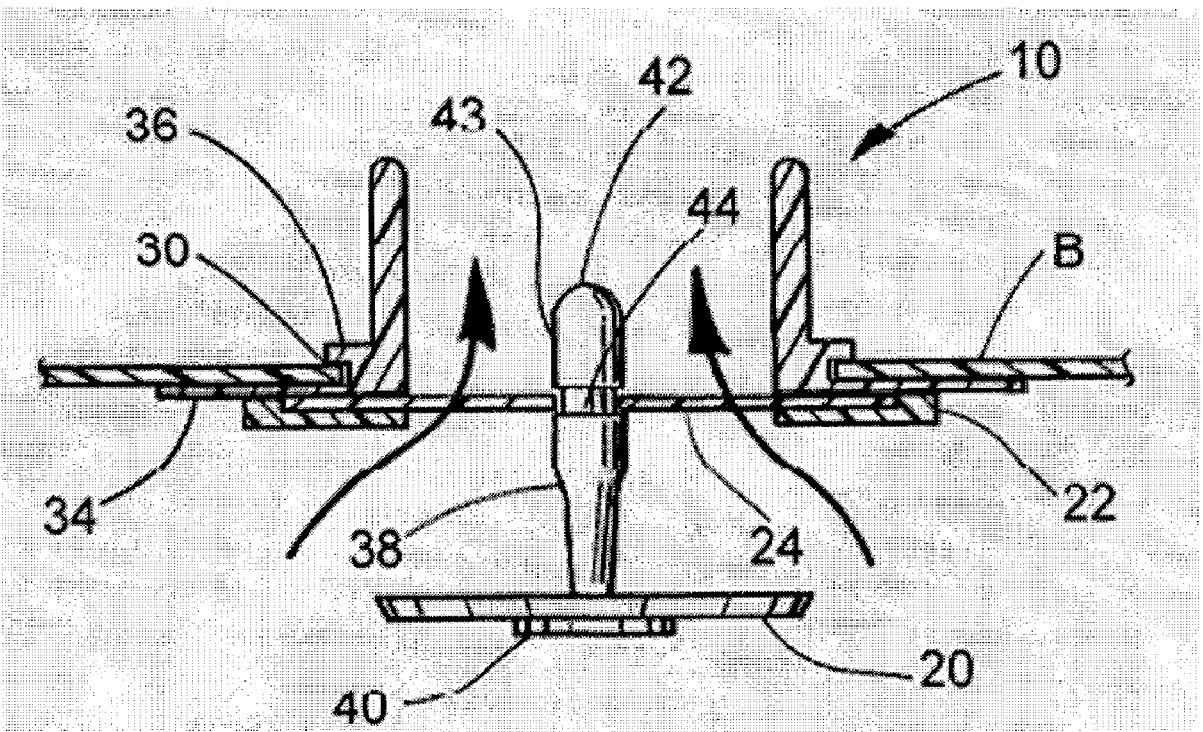
FIG. 8 is a side elevation view of the valve illustrated in FIG. 3 showing an alternative embodiment of the valve shaft.

FIG. 8 illustrates an alternative embodiment of valve assembly 10, wherein shaft includes a cylindrical section 43 which operates in conjunction with mounting bar 24 in retaining valve diaphragm 20 in the open position. In this alternative view, the cylindrical section 43 also includes an optional detent 44 which may receive the edge of bar 24 forming orifice 39 to provide a more positive restraint on the shaft 38 and valve diaphragm 20 to ensure the diaphragm remains in the open position during the evacuation of air from the inside of the bag.

Figure 9:
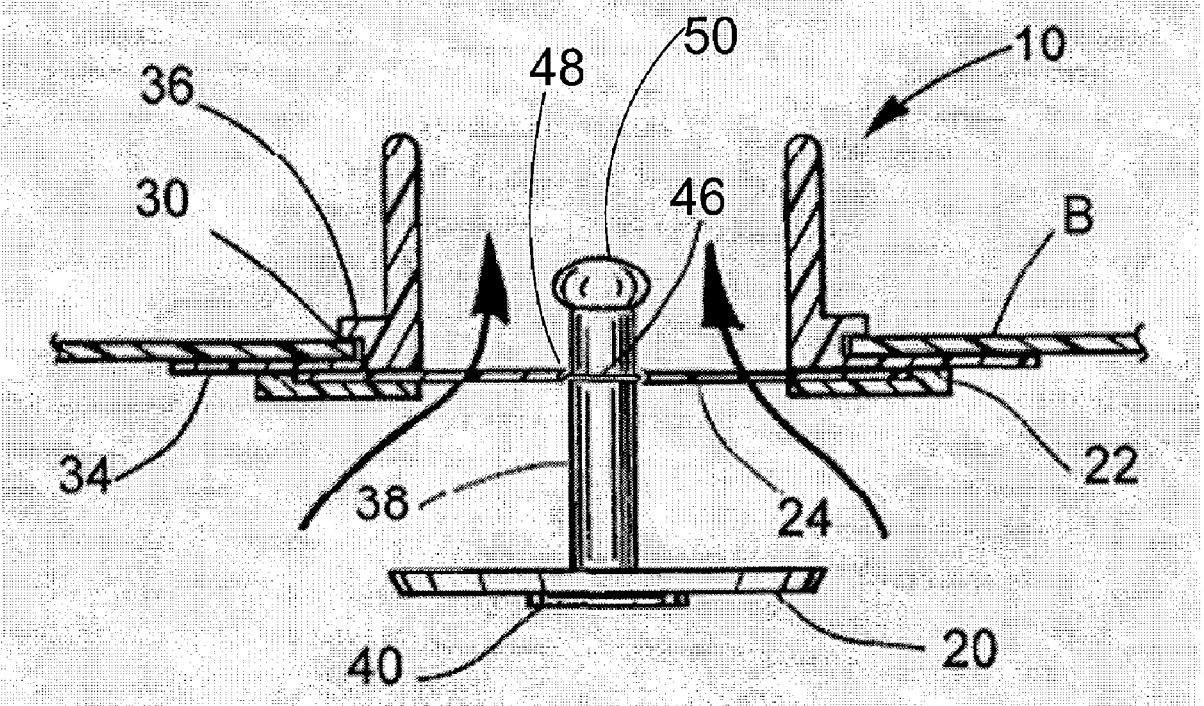
FIG. 9 is a side elevation view of the valve illustrated in FIG. 3 showing an alternative embodiment of the valve shaft.

FIG. 9 illustrates a still further embodiment of valve assembly 10 wherein shaft 38 has disposed thereon a raised ring 46, which is illustrated in the figure as approximately semi-circular and is generally complementary in shape to a bar detent 48, so as to be securely retained therein. Shaft 38 further may include a knob 50 to provide ease in grasping the shaft 38 when it is desirable to release valve diaphragm 20 from the open position, as when getting ready to fill the bag B with air.

Figure 10:
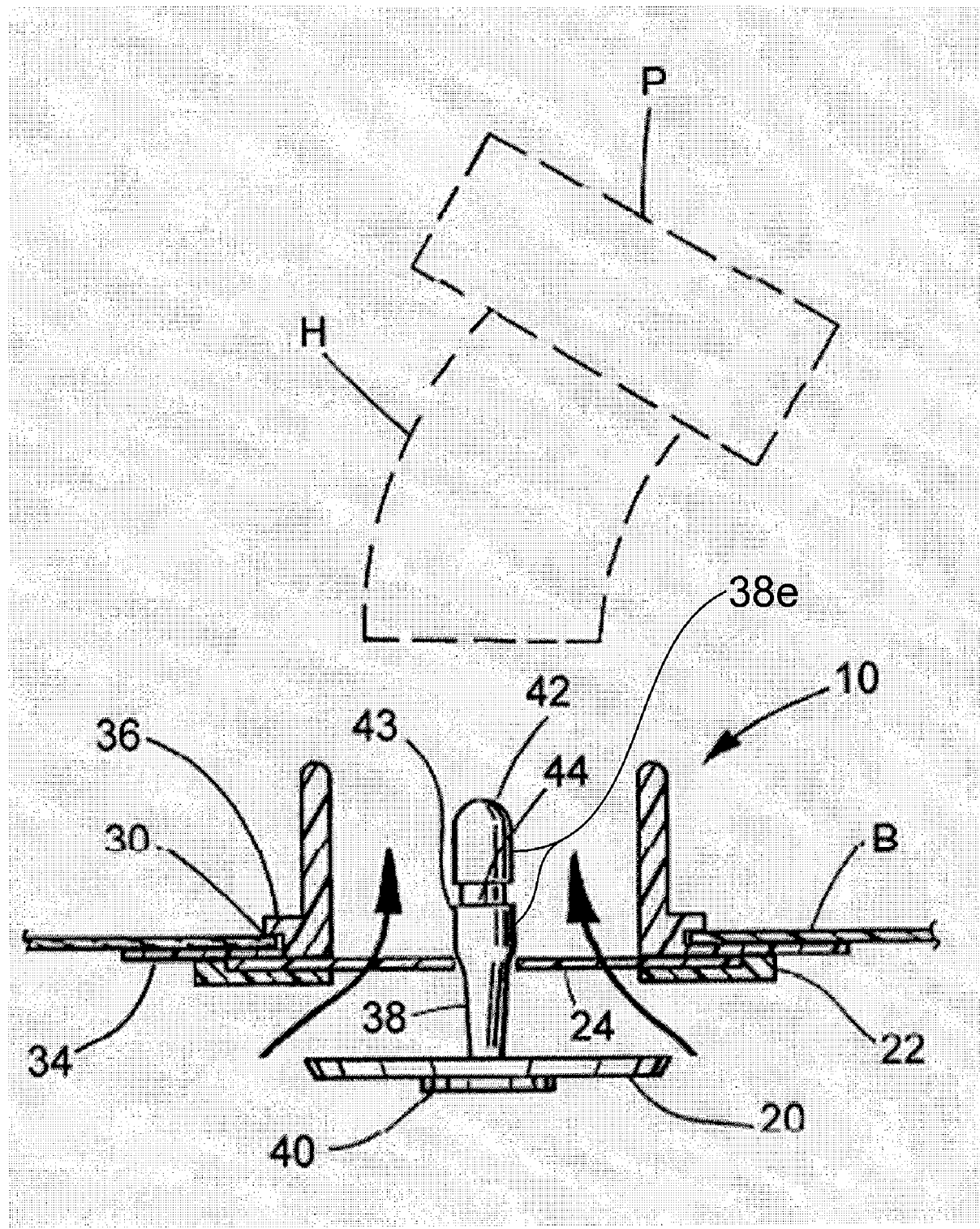
FIG. 10 is a side elevation of the alternative embodiment shown in FIG. 8.
Figure 11:
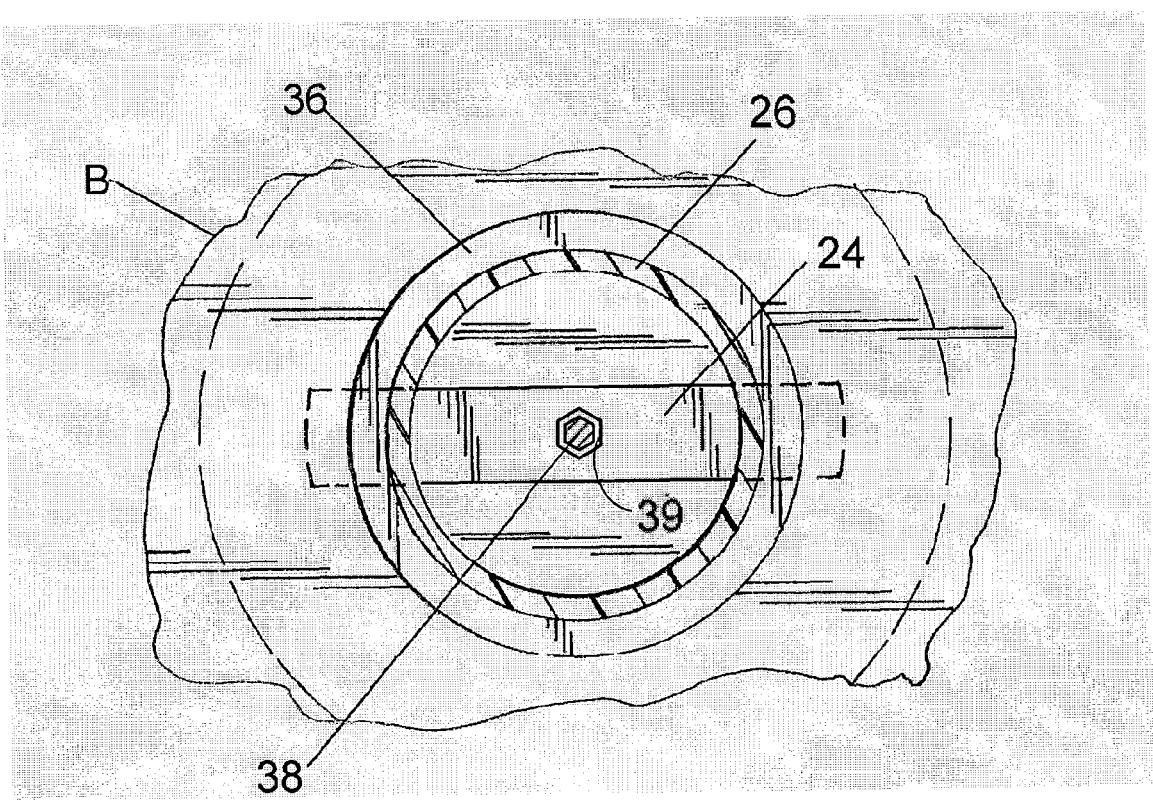
FIG. 11 is a top view of an alternative embodiment of the valve illustrated in FIG. 5.

In operation, a conventional air supply hose H is applied to the opening of valve 10 as illustrated in FIG. 10. The flow of air from air pump P into valve body 26 forces valve diaphragm open and the bag B is filled to the desired pressure. the internal pressure of the air contained in the bag B causes the valve diaphragm to seat and seal against loss, as is illustrated in FIG. 4. On exhaust, valve assembly is opened as illustrated in FIG. 6, by pressing axially inwardly on shaft 38 until the enlarged section 38e of shaft 38 frictionally engages the sides of orifice 39 in mounting bar 24. The valve diaphragm is thereby retained in the open position and the air may exit as illustrated in FIG. 7. Valve diaphragm 20 may be released from orifice 39 by an upward pull on shaft 38 or by pressing washer 40 moving the assembly of diaphragm 20 and shaft 38 toward the closed position whereby shaft 38 rides freely in orifice 39.

Those skilled in the art will recognize that numerous equivalent alternative structures may be fabricated utilizing functionally equivalent structure such as alternative resilient materials, attachment mechanisms and cooperative frictional holding techniques as those described and illustrated without departing from the scope and spirit of the invention.

The following is a list of suitable parts and materials for the various elements of the preferred embodiment of the present invention.

| PARTS LIST | |
|---|---|
| PART NO. | DESCRIPTION |
| B | dunnage bag |
| C | cargo area |
| H | air hose |
| $L_1, L_2, L_3, \ldots L_x$ | load articles |
| P | air pump |
| T | truck |
| 10 | valve assembly |
| 12 | protective cap |
| 14 | latching handle |
| 16 | lugs |
| 17 | beveled ring |
| 18 | annular seal |
| 20 | valve diaphragm |
| 22 | valve flange |
| 24 | mounting bar |
| 26 | valve body |
| 30 | annular detent |
| 34 | radial flange |
| 36 | radial flange |
| 38 | shaft |
| 39 | orifice |
| 40 | washer |
| 42 | shaft free end |
| 43 | cylindrical section |
| 44 | detent |
| 46 | raised ring |
| 48 | bar detent |
| 50 | knob |

The foregoing embodiments are presented by way of example only; the scope of the present invention is to be limited only by the following claims.

The invention claimed is:

1. A valve assembly for an inflatable, bag-like container comprising:
 a cylindrical valve body having a lower flange secured in pneumatically sealed relation to said container;
 a mounting bar disposed transversely across said valve body adjacent said flange, said mounting bar having a central opening therein;
 a valve diaphragm disposed below the lower flange of said valve body, said valve diaphragm being fixed to a shaft at the shaft fixed end, and having a cross section complementary to said bar opening and said shaft extending to a free end generally perpendicularly upward of the center of said diaphragm through the central opening in said mounting bar;
 said shaft and diaphragm being retained in said opening for reciprocal axial movement relative to said mounting bar and flange from a closed position whereby said diaphragm forms a pneumatic seal against said flange and an open position whereby said diaphragm is displaced axially from said flange and a pneumatic gas may enter and exit said container; and
 said shaft being adapted with an enlarged cross-section intermediate its end fixed to said diaphragm and a free end whereby, when said enlarged section frictionally engages an inner side of said central opening, said shaft is retained in fixed relation and said diaphragm is retained in an open position, enabling continued deflation of said container.

2. The valve assembly of claim 1 wherein said shaft and opening are circular.

3. The valve assembly of claim 1 wherein the shaft and opening are polygonal.

4. The valve assembly of claim 2 wherein the shaft includes an annular detent disposed thereon intermediate the diaphragm and the free end, the width of which is complementary to the thickness of the mounting bar at the opening whereby, when the detent engages the mounting bar opening, the shaft and diaphragm are retained in fixed relation to said flange.

5. The valve assembly of claim 2 wherein the shaft has an annular ring disposed thereon, intermediate the diaphragm and the free end, and said opening in said mounting bar has an annular groove complementary in cross-section too the annular ring whereby, when said ring is engaged by said groove, said shaft and diaphragm are retained in fixed relation to said flange.

6. The valve assembly of claim 2 wherein said valve body has disposed thereon a second flange, adjacent said lower flange, and spaced therefrom a distance substantially equal to the thickness of said container, whereby said valve body may be pneumatically sealed to said container on both of said flanges.

7. The valve assembly of claim 2 wherein said valve body includes a cap, pivotally attached to the upper end thereof, said cap having an internal cylindrical shape complimentary to said valve body and is received in mechanical pneumatic sealed relation to said valve body when in the closed position.

8. The valve assembly of claim 7 wherein said cap includes a handle for enhancing the movement of the cap between the closed and open positions.

9. The valve assembly of claim 8 wherein said handle includes a latching detent and said valve body includes lug means disposed to receive the latching detent when said cap is moved to the closed position, further mechanically pneumatically sealing the cap to said valve body.

* * * * *